Feb. 14, 1961    H. G. FEISSEL    2,971,627
MEANS FOR POSITIONING AN ACCOUNT OR RECORD SHEET
IN AN ACCOUNTING MACHINE
Filed Oct. 8, 1957    3 Sheets-Sheet 1

Feb. 14, 1961　　　H. G. FEISSEL　　　2,971,627
MEANS FOR POSITIONING AN ACCOUNT OR RECORD SHEET
IN AN ACCOUNTING MACHINE
Filed Oct. 8, 1957　　　3 Sheets-Sheet 2

United States Patent Office 2,971,627
Patented Feb. 14, 1961

2,971,627

MEANS FOR POSITIONING AN ACCOUNT OR RECORD SHEET IN AN ACCOUNTING MACHINE

Henri G. Feissel, Paris, France, assignor to Machines Automatiques Modernes (Societe a Responsabilite Limitee), Paris, France Filed Oct. 8, 1957, Ser. No. 688,865

Claims priority, application France Oct. 10, 1956

3 Claims. (Cl. 197—127)

The present invention relates to means for positioning an account or record sheet in an accounting machine.

In keyboard accounting machines utilizing account sheets, it may be essential to position a sheet with great precision after its introduction into the machine and before the printing of a further line of figures or characters on the sheet. This positioning is more precise when the speed of the sheet is slow, but slow movement of the sheet obviously slows down the speed of operation of the machine.

An object of the present invention is to obviate this difficulty.

In accordance with one feature of the invention, an account sheet driven by a motor is caused to move rapidly in one direction a little beyond the position of a fresh line to be printed and then to move slowly in the opposite direction.

In accordance with a second feature of the invention, the voltage for the energization of the motor is reversed and reduced at the end of the first movement of the sheet in one direction and is interrupted at the end of the second movement of the sheet in the other direction.

In accordance with a third feature of the invention, the account sheet is braked at the end of its first movement and at the end of its second movement by an electromagnetic brake.

In accordance with a fourth feature of the invention, the electromagnetic brake is controlled by the electric potential of a brush sliding on a conducting circuit printed on the said sheet.

In accordance with a fifth feature of the invention, the motor for driving the sheet and the electromagnetic brake are controlled in the first instance at the end of the first movement when the sliding brush is insulated from a part of the printed circuit by partial opening of this circuit, effected at the end of the preceding operation, and in the second instance at the end of the second movement by the reapplication of the potential of the said part of the printed circuit to the said brush.

For a better understanding of the invention, the same will now be described with reference to the accompanying drawings, in which.

Figure 1:
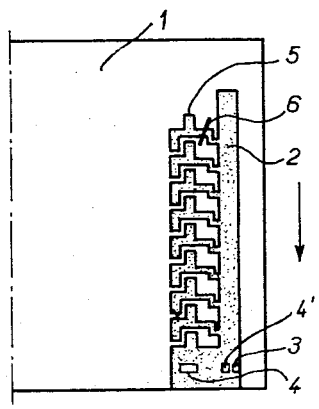
Figure 1 shows a printed conductive circuit of an account sheet.

In all of these figures, common elements are designated by the same reference numerals. In the Figure 3 the record sheet 1 is set along a support 71 and is advanced over said support 71 by means of feed rollers 49, 50, 51, 52. Said feed rollers are caused to rotate in either direction by means of the driving motor 41, the gear-wheels 42, 43, 44, and gear connections, not shown between rollers 44 and 51, said motor being capable to rotate in either direction. A braking device for said motor comprises the strip 46 which rubs against the shaft 45 when the lever 47, movable around the axis 48, is displaced by the energization of the electromagnet 11. The connections of said electromagnet 11 are shown in the Figure 4 and will be explained hereafter. The sheet bears parallel to one of its sides an impression formed of a conductive material. A cutter 54 breaks said impression when the electromagnet 63 is energized, so as to insulate a part of said impression from the other part. Two brushes 3 and 4 rub against the sheet in front of the cutter 54 so that the break effected by said cutter is situated between said brushes. The brush 3 (shown in Figure 2) is always at the potential of the earth of the apparatus. The brushes 3 and 4 are connected as shown in the Figure 4. A printing device 55, well known, is provided with a printing station 59, 60, 61. The printing of characters is effected by the depression of the keys 56. A special starting key 57, when it is depressed, closes the contact 58 so that the electromagnet 63 is energized by the source 65 and the cutter 54 cuts the record sheet through the conducting impression. Another key 64, shown in the Figure 4, connects, when it is depressed, the feeding voltages $U_1$ and $U_2$ to some contacts of relays of the wiring.

The general operation of the device will now be explained. When the record sheet 1 is introduced in the direction of the arrow between the rollers 51, 52, the key 64 (Fig. 4) is depressed and the motor 41 drives by the rollers 51, 52 the sheet at high speed until the brush 4 is insulated from the earth or frame of the apparatus by the first break in the sheet: then, the electromagnet 11 is energized (as shown hereafter), the motor 41 is braked and the feeding of said motor is inverted, as shown hereafter. Said sheet starts again in a direction opposite to its first direction (that is to say a direction opposite to that of the arrow) with a low speed and when the brush 4 is set again to the potential of the earth of the apparatus, the motor is braked again and its feeding voltage is cut off. Then, if it is wanted that the sheet effects a new displacement equal to the distance of two consecutive lines, the key 57 is depressed, the electromagnet 63 is energized, the cutter 54 is actuated and a break is effected in the sheet. This break insulates the brush 4 from the earth of the apparatus, the electromagnet 11 is temporarily energized, the strip 46 brakes temporarily the motor 41, after which the motor rotates again at low speed and drives the sheet in a direction opposite to that of the arrow until such time as the brush 4 is again set to the potential of the earth of the apparatus. At this time, the electromagnet 11 is energized, the motor is braked and its feeding voltage is cut off. The sheet may be ejected with a great speed by depressing an ejection key not shown.

Figure 2:
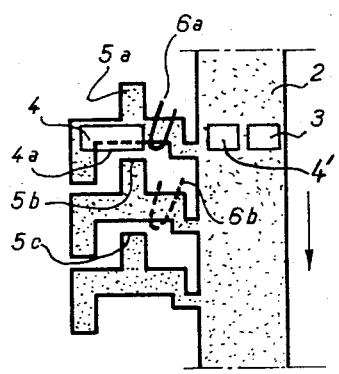
Figure 2 shows on an enlarged scale, a portion of the circuit of Figure 1.
Figure 3:
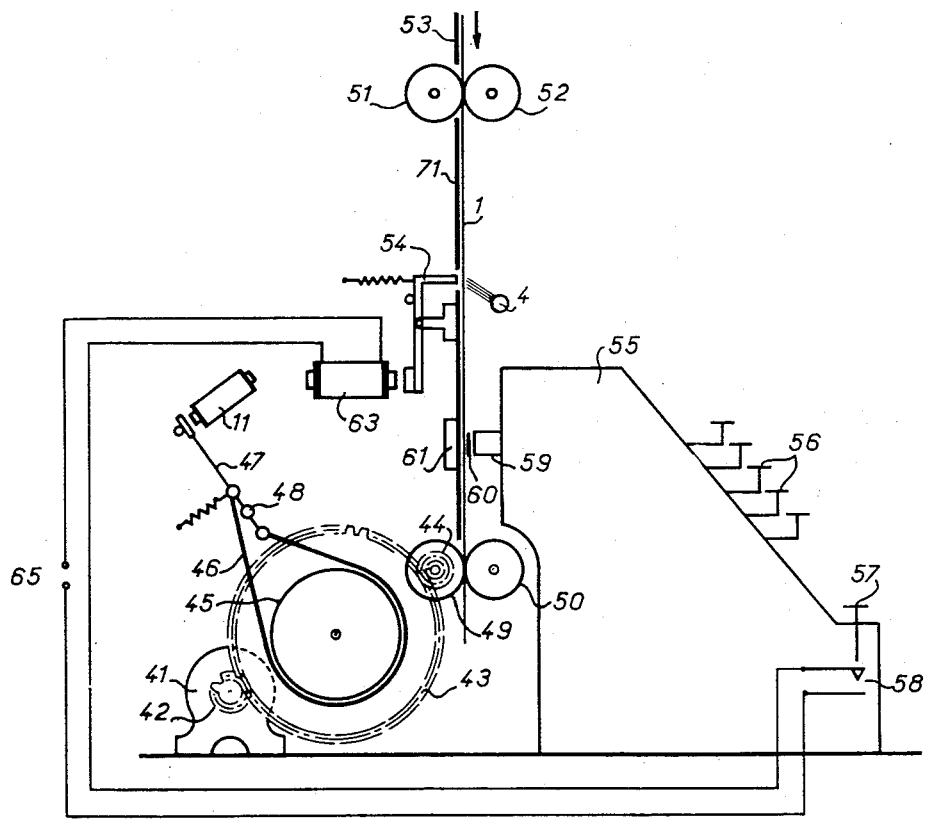
Figure 3 illustrates the principle of a device according to the invention.

In Figure 1, the account sheet is shown at 1 and bears parallel to one of its shorter sides an impression formed of a conductive material having the form indicated. The sheet moves initially upon introduction into the machine, in the direction of the arrow. Three brushes, the positions of which are shown in chain-lines at 3, 4 and 4', are connected to a circuit controlling the motor driving the sheet and the electromagnetic brake as shown in the Figure 4. These brushes slide on the sheet at the positions indicated. It will clearly be seen that the brush 3 is always at the potential of the printed circuit. This potential will be assumed, by way of example, to be equal to the potential of the earth of the apparatus, i.e. zero volts, the said brush therefore being connected effectively to the frame of the apparatus. The connection of the brush 4' will be shown hereafter. The brush 4 is also at the same potential. However, if the circuit is broken at 6, the brush 4 is insulated when it reaches the level of this break. Referring to Figure 2, the U-shaped break 6a interrupts the circuit along two lines and insulates the brush 4 when it is in the position indicated, that is to say, as soon as the said brush ceases to be in contact with the portion 5b of the printed circuit.

In this device, a motor rotates the rollers for driving the sheet. The said rollers are also controlled by the electromagnetic brake. A torque limiter is disposed between the brake and the motor so that the braking effort is reduced as soon as the action of the brake commences, while the motor still continues to turn. The operation of the device is then as follows: as the sheet moves in the direction of the arrow, the brush 4 is insulated from the printed circuit when the lower portion 4a of the said brush is exactly above the portion 5b of the said circuit by reason of the break 6a effected at the end of the preceding operation. This insulation produces the electromagnetic braking of the sheet and therefore stoppage of the sheet a little further on, and thereafter the change in the direction of operation of the motor, as also a reduction of its speed. The sheet then continues to move in a direction opposite to that indicated by the arrow, the brush 4 remaining insulated as long as its portion 4a is above the portion 5b of the printed circuit. When these two portions again reach coincident positions, conduction is restored, and this conduction effects stopping of the motor with electromagnetic braking of the sheet. As pointed out above, if it is wanted that the sheet effects a new displacement equal to the distance of two consecutive lines, the key 57 (Fig. 3) is depressed and a new break is effected in 6b so that the brush 4 is again insulated.

The device for the control of the electromagnetic brake, as also the device for feeding the motor, will now be described in greater detail with reference to Figure 4. A source E feeds different contacts or relays. A thyratron 7 comprises in its anode circuit the winding 11 of the electromagnetic brake and in parallel with the latter the coil 12 of a relay. The anode of said thyratron is fed by a source 13. When the thyratron 7 is fired, the relay 12 is energized and consequently, the relay 30 is energized by the source E through contact 12d closed and remains energized because the contact 30c is now closed. The grid of said thyratron 7 is connected to a point 23 the potential of which is determined by the potential of the brush 4 and by the position of contacts 30a and 30b of the relay 30.

Four cases may be distinguished concerning the firing of said thyratron 7:

(a) The relay 30 is not energized, the contacts 30a and 30b are at the rest and the brush 4 is earthed at zero potential. The resistances 15, 16, 17 are connected to the sources 19 and 14, the potential of the point 23 is negative and the thyratron 7 is not fired.

(b) The relay 30 is energized and the brush 4 is earthed. The contacts 30a, 30b are in the working position, the resistances 15, 16, 17 are connected to the sources 26 and 20, the potential of the point 23 is positive and the thyratron 7 is fired.

(c) The relay 30 is not energized and the brush 4 is insulated from the earth of the apparatus. The resistances 15, 16, 17 are connected as in case (a) but no derivation of current is generated through the brush 4, the potential of the point 23 is positive and the thyratron is fired.

(d) The relay 30 is energized and the brush 4 is insulated from the earth of the apparatus. The resistances 15, 16, 17 are connected as in case (b) but no derivation of current is generated through the brush 4, the potential of the point 23 is negative and the thyratron 7 is not fired. After the thyratron 7 has been ionised, it is quickly de-ionised by the negative voltage of the source 24 applied to its anode through the condenser 25 because the contact 12a is in its working position.

Figure 4:
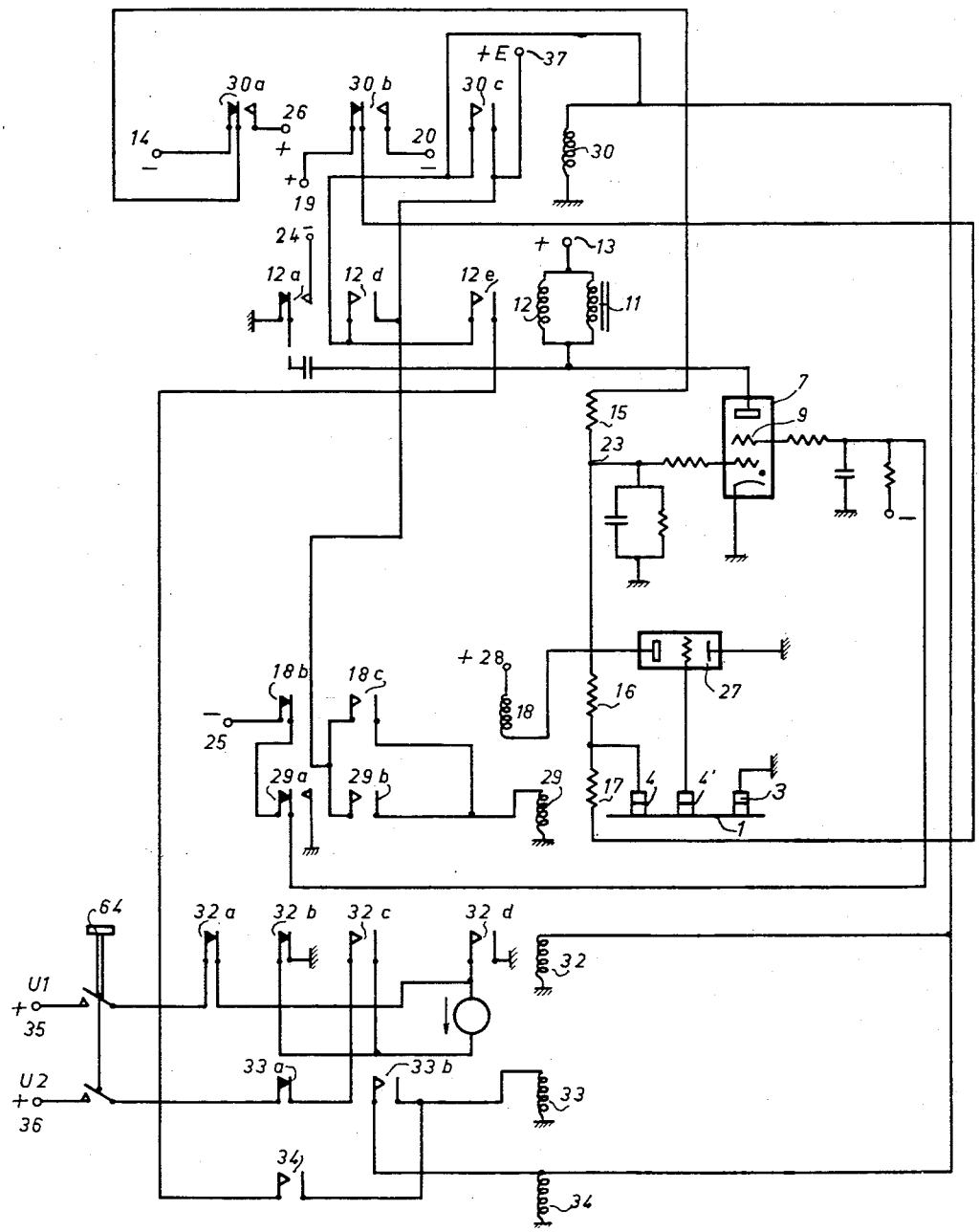
Figure 4 illustrates a device for controlling the electromagnetic brake of the motor and the feeding of the motor.

In this Figure 4, the triode 27 and the relays 18 (Figure 4) and 29 (Figure 6) constitute a safety circuit for the firing of the thyratron 7. The anode feed voltage of the triode 27 is indicated at 28. The relay 30 constitutes the device for changing over the voltage of the control grid of the thyratron 7. The feed voltages $u_1$ and $u_2$ connected to the terminals 35 and 36 and the relay contacts 32 and 33 constitute the device for controlling the energizing winding 31 of the motor driving the account sheet. The machine comprises an additional brush 4' adjusted to slide on that portion of the printed conducting circuit of the account sheet which is constantly at zero potential, the said brush 4' being connected to the grid of the triode 27.

In the positioning of the account sheet during its introduction, three phases may be distinguished. In the first, the brush 4 is at earth potential, that is to say, at a potential of zero volts, and the thyratron 7 is not ionised. The sheet then moves in a first direction at high speed. In the second phase, the brush 4 is insulated from earth and the thyratron 7 is temporarily ionised (the deionisation circuit of the thyratron being the circuit 24, 25). The sheet is then braked and stopped and starts again in the opposite direction at low speed. In the third phase, the brush 4 is earthed and the thryratron is temporarily ionised again. The sheet is again braked and finally stopped, the feed of the motor being interrupted.

This having been recalled, the operation of the circuits illustrated is as follows: when the sheet is introduced into the machine and when the brush 4' (Figure 4) commences to slide on the printed circuit of the said sheet, the said brush 4' is brought to earth potential, the triode 27 feeds and the relay 18 is energized, the contact 18b being opened and the contact 18c closed. The closing of the contact 18c results in the energization of the relay 29 by the voltage source +E and the terminal 37 (the second terminals, not shown, of all the feed voltages of the circuit arrangements are connected to the common earth of the said circuit arrangements). The relay 29 is maintained energized by the contact 29b. The contact 29a (Figure 4), when it is closed, establishes the connection between the screen grid 9 of the thyratron 7 and earth, the said grid being at the same time disconnected from the negative voltage 25. The thyratron can therefore be fired.

In the first phase of the positioning, the thyratron is not ionised, the relay 12 is not energized and consequently the relay 30 is not energized, so that the contacts 30a and 30b are in the positions indicated in Figure 1. In the second phase of the positioning, the thyratron 7 is temporarily ionised and the relay 12 is thus temporarily energized. The contact 12d, which is temporarily closed, establishes the circuit for the relay 30, which is then energized, and the contact 30c closes, whereby the energization of the relay 30 is maintained during the second and third phases of the positioning. The contacts 30a and 30b (Figure 4) are therefore changed over so as to connect the voltage sources 20 and 26 to the control grid of the thyratron 7. This changeover has the object, as previously indicated, of controlling the ionisation of the thyratron 7 when the brush 4 is again connected to earth in the third phase of the positioning of the sheet.

The energizing winding 31 of the motor driving the account sheet may be fed by either of the feed sources $u_1$ and $u_2$ connected to the terminals 35 and 36 respectively. The voltage $u_1$ is higher than the voltage $u_2$. In the first phase of the positioning, the relay 12 is not energized, and the relays 32 and 34 are therefore also not energized, while the motor 31 is fed by the voltage $u_1$ in the direction of the arrow, the contacts 32a and 32b being closed and the contacts 32c and 32d being opened. The motor therefore rotates rapidly in a particular direction. In the second phase of the positioning, the relay 12 is temporarily energized, whereby the relays 32 and 34 are energized. The energization of the relay 32 is maintained by the contact 30c, which is maintained in the closed position. The relay 34 is a slow release relay which closes its contact 34a only at the end of a time slightly greater than the temporary ionisation period of the thyratron 7. Under these conditions, the contact 34a closes, while the contact 12e is opened again, so that the relay 33 is not energized. The energization of the relay 34 is maintained by the contact 30c, which is maintained in the closed position. Therefore, the contacts 32c, 32d and 33a are closed and the contacts 32a and 32d opened so that the motor 31 is fed in the direction opposite to the arrow by the reduced voltage $u_2$. The direction of rotation of the motor is therefore reversed and its speed is reduced. At the beginning of the third phase of the positioning, the relay 12 is temporarily energized again, the contact 12e is closed and, since the contact 34a is closed, the relay 33 is energized and maintained in the energized state by the contact 33b. Therefore, the contact 33a is opened and the feed of the motor is interrupted. The motor is then braked and stopped almost instantaneously.

All the relays energized at the end of the third phase of the positioning are deenergized at the beginning of the control of a line shift or of an ejection by manual operation of a push-button (not shown), the depression of the said button temporarily breaking the general energization circuit of the said relays, as also the feed of the said motor, whereby the holding contacts are opened. This operation is well known in the art and has therefore not been described. When it is wanted that the sheet effects a new displacement equal to the distance of two consecutive lines, the operator depresses the key 57 (Fig. 3), a new break is effected in said sheet so that the brush 4 is again insulated. Then the following operations are the same as described above for the second and the third phases of the positioning. Also it is clear that in such a device the successive movements of the sheet at low speed always take place in the same direction, precisely by virtue of the fact that the first movement of the sheet at the introduction has gone beyond the printing line. This arrangement is very advantageous, in that it permits taking up of play in the pinions situated between the motor and the rollers for driving the sheet.

I claim:
1. Device for setting a record sheet in an accounting machine, comprising a driving motor adapted to displace said sheet in a first direction, a relay, an electro-magnetic brake for said motor controlled by said relay, means for temporarily energizing said relay when said record sheet reaches the printing position whereby said sheet is temporarily stopped beyond the printing position, means controlled by the energization of said relay for reversing the direction of the rotation of said motor and diminishing its speed so that said record sheet is moved in a direction opposite to said first direction with a reduced speed, means for again energizing said relay when said record sheet again reaches the printing position whereby said sheet is braked again, and means for breaking the feeding of the motor whereby said sheet is stopped.

2. Device for setting a record sheet in a printing position in an accounting machine, comprising a driving motor for moving said record sheet and adapted to be fed by either one of two feeding voltages, an electromagnetic brake for said motor controlled by a relay, a conducting circuit printed on said sheet adapted to be connected to a fixed potential and having a principal circuit connected thereto and secondary circuits which may be electrically insulated from said principal circuit, a brush adapted for rubbing against said secondary circuits during the movement of said record sheet, control means for both said relay and said motor connected to said brush and arranged so that said relay is temporarily energized when said brush is insulated from said principal circuit whereas the feeding voltage of said motor is switched, switching means for said control means for said relay arranged so that said relay is again temporarily energized when said brush is reset to said fixed potential, whereby the feeding voltage of the motor is cut off.

3. Device for positioning a record sheet in a printing position in an accounting machine comprising a driving motor adapted to be fed by either one of two feeding voltages and controlling the movement of said record sheet, an electromagnetic brake for said motor controlled by a relay, a conducting circuit printed on said sheet comprising a principal circuit adapted to be connected to a fixed potential and secondary circuits adapted to be connected one at a time by a stationary brush rubbing on said sheet during its movement to circuit means controlling the energization of said relay and said motor, means for breaking said conducting circuit after each operation of printing so that one of said secondary circuits is insulated from the principal circuit, means for feeding said motor with said first feeding voltage whereby said sheet is moved at high speed in a first direction, said circuit means controlling the energization of said relay and said motor being temporarily energized when said brush is insulated from said principal circuit whereas the feeding voltage of said motor is switched whereby the motor is braked and said record sheet is stopped and started again in a direction opposite to its first direction with a low speed, when said brush makes contact with the first insulated secondary circuit met during the movement of the record sheet in said first direction, switching means for said circuit means arranged so that said relay is again temporarily energized when said brush, during said movement of the sheet in opposite direction, makes contact with a secondary circuit connected to said fixed potential, whereby the motor is braked, its feeding voltage is cut off and the record sheet is stopped in printing position.

References Cited in the file of this patent
UNITED STATES PATENTS

| | | |
|---|---|---|
| 918,813 | Armstrong | Apr. 20, 1919 |
| 947,744 | Stohr | Jan. 25, 1920 |
| 2,178,304 | Holness | Oct. 31, 1939 |
| 2,266,759 | Huck | Dec. 23, 1941 |
| 2,387,650 | Davis | Oct. 23, 1945 |